United States Patent [19]

Jennings et al.

[11] 3,928,079

[45] Dec. 23, 1975

[54] BATTERY CABLE WITH DETACHABLY RETAINED CONNECTOR

[75] Inventors: Gene A. Jennings, Bristolville; John J. Streitferdt, Warren; Lyle B. Suverison, Fowler, all of Ohio

[73] Assignee: General Motors Corporation, Detroit, Mich.

[22] Filed: Oct. 7, 1974

[21] Appl. No.: 512,869

[52] U.S. Cl. .......... 136/135 S; 339/116 R; 339/224
[51] Int. Cl.² ................ H01M 5/00; H01R 3/02
[58] Field of Search ............ 136/135 R, 135 S, 133; 339/116 R, 224, 232

[56] References Cited
UNITED STATES PATENTS

| 3,605,065 | 9/1971 | Shannon | 136/135 S X |
| 3,607,441 | 9/1971 | Mix | 136/135 S X |
| 3,775,730 | 11/1973 | Rowles | 136/135 X |

Primary Examiner—John H. Mack
Assistant Examiner—H. A. Feeley
Attorney, Agent, or Firm—F. J. Fodale

[57] ABSTRACT

A battery cable has a rotatable connector bolt detachably retained in a cap of moldable corrosion resistant, insulator material molded around the terminal secured to the end of the insulated wire.

2 Claims, 4 Drawing Figures

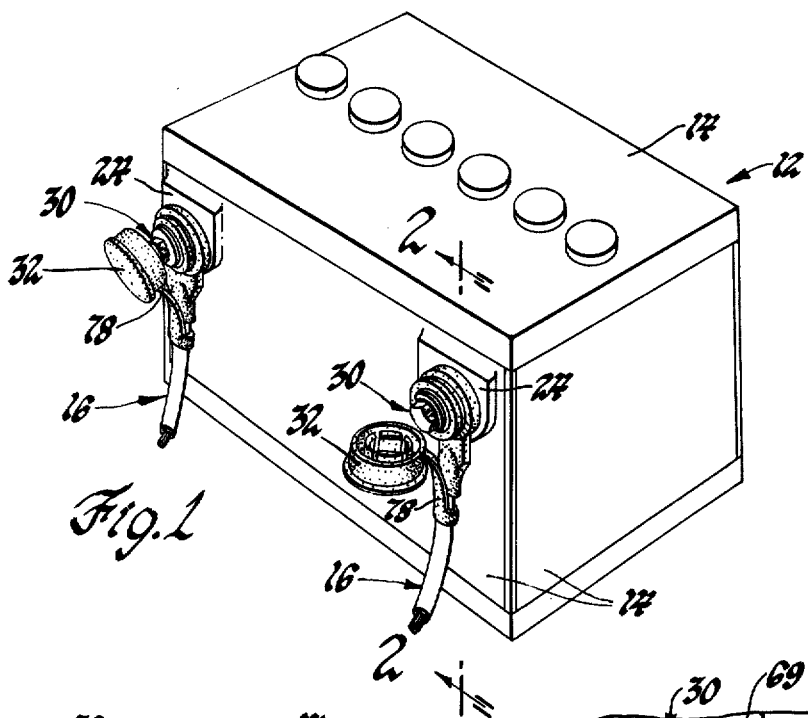
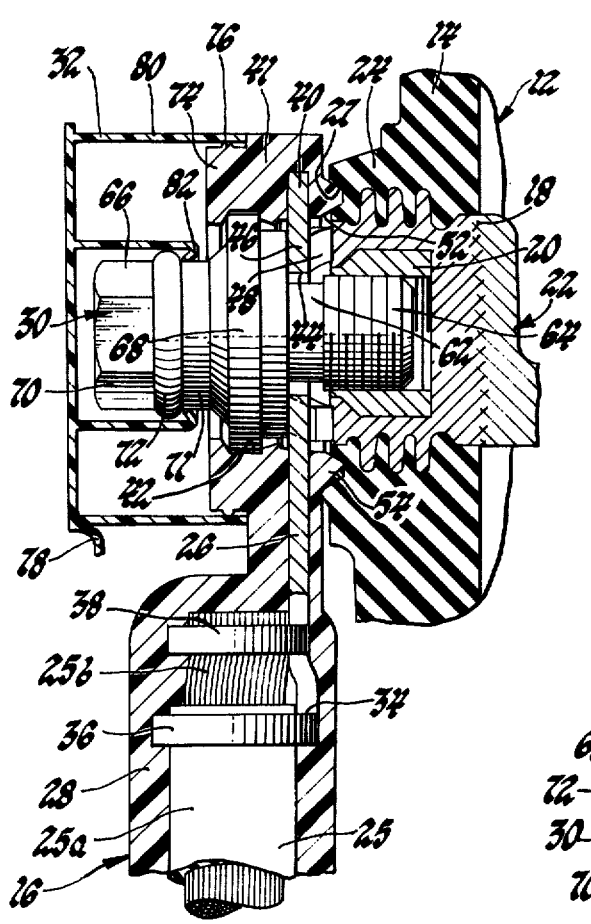

BATTERY CABLE WITH DETACHABLY RETAINED CONNECTOR

This invention relates generally to battery cables and more specifically to battery cables having a retained connector for mechanically and electrically connecting the battery cable terminal to a terminal of an electric storage battery which are commonly used in automobiles.

The U.S. Pat. No. 3,775,730 issued Nov. 27, 1973 to Rowles et al for a "Corrosion Proof Battery Terminal and Cable Connector Therefor" shows a battery cable with a connector bolt retained in assembly with the battery cable terminal by locking tabs struck from the cable terminal which is partially embedded in a non-corrosive elastomeric cap. These locking tabs are struck from portions of the cable terminal adjacent a through aperture after the threaded portion of the bolt shank is inserted through the aperture in the cable terminal. The locking tabs protrude into a recess formed by the upper unthreaded portion of the bolt shank which has a smaller diameter than the head of the bolt or the threaded portion of the shank thereby retaining the bolt.

These locking tabs while providing satisfactory retention have several disadvantages. For instance, the tabs must be formed afer the threaded shank portion of the connector bolt is inserted through the cable terminal aperture in a separate mechanical operation which involves holding the connector bolt in a precise assembled relationship with the terminal during striking operation and the use of perishable tooling. Also since the locking tabs are permanently deformed portions of the battery cable terminal, the connector bolt is permanently retained in assembly with the battery cable terminal. Thus the threaded bolt cannot be detached from the battery cable terminal without destroying the terminal should the need for replacement, cleaning, or the like, arise.

Broadly the object of this invention is to provide a battery cable with a retained connector for mechanically and electrically connecting the battery cable terminal to a battery terminal in which the connector is retained in assembly with the battery cable terminal in an improved manner.

Another object of this invention is to provide a battery cable with a rotatably retained threaded connector for mechanically and electrically connecting the battery cable terminal to a battery terminal in which the threaded connector is rotatably retained in assembly with the battery cable terminal but which may be readily detached from the cable for replacement, cleaning and the like.

Yet another object of this invention is to provide a battery cable with a rotatably retained threaded connector for mechanically and electrically connecting the battery cable terminal to a battery terminal in which the the threaded connector is retained in assembly with the battery cable terminal by means which do not require a separate mechanical operation permanently deforming a portion of the cable terminal while the threaded connector is held in assembly with the cable terminal.

Still another object of this invention is to provide a battery cable with a retained connector for mechanically and electrically connecting the battery cable terminal to a battery terminal in which the connector is retained in assembly with the battery cable terminal by an integral flexible lip means on a non-corrosive molded cap surrounding the cable terminal which flexible lip means is provided without significantly increasing the cost of the cap and allows detachment of the threaded connector without injury to the battery cable terminal or the cap.

Other objects and features of this invention will become apparent to those skilled in the art as the disclosure is made in the following detailed description of a preferred embodiment of this invention as illustrated in the accompanying sheet of drawings in which:

FIG. 1 is a perspective view of an electric storage battery having battery cables embodying this invention connected to side terminals of the battery.

FIG. 2 is a section view taken substantially along the line 2—2 of FIG. 1 and shows the internal details of one of the battery cables with a detachably retained connector to one of the side terminals of the battery.

FIG. 3 is an enlarged fragmentary sectional view of the battery cable with the detachably retained connector shown in FIG. 2.

FIG. 4 is an exploded perspective view of the battery cable with the detachably retained connector shown in FIGS. 2 and 3.

Referring now to the drawings, FIG. 1 shows a battery 12 in which several battery elements or cells are appropriately arranged in a container defined by the walls 14. The negative and positive battery terminals are both located on a common side wall and have battery cables 16 individually connected thereto.

Referring now to FIG. 2, the right-hand battery cable 16 operatively connected to the typical side terminal of the battery 12 is shown in greater detail. The battery 12 is of a conventional molded construction in which a case wall 14 is molded around a plug 18 which passes through and sealingly engages the battery wall 14. The plug 18 has a turn resistant and anti-extraction outside configuration and is thus securely anchored in the wall 14. The plug 18 in turn securely contains a threaded socket 20 of non-circular outline, for example a steel hexagonal nut, which may be secured in the plug 18 in a conventional manner, such as casting the plug 18, normally a soft lead, around the threaded socket 20. The plug 18 and threaded socket 20 comprise one of the typical side terminals 22 of the battery 12. As disclosed in the aforementioned patent, the wall 14 has an exterior boss 24 which provides an annular sealing groove 27 which circumscribes the outer face of the side terminal 22.

The battery cable 16 comprises an insulated wire 25, a terminal 26, a molded cap 28, and a detachably retained connector bolt 30 and may also include a detachable cover 32. The terminal 26 has a ferrule portion 34 having axially spaced pairs of wings 36 and 38 which are respectively crimped onto the end of the wire insulator jacket 25a and stripped end portion of the wire conductor 25b in a conventional manner. The terminal 26 also includes a ring portion 40 for electrically connecting the wire conductor of the cable to the side terminal 22. The cap 28 which is made of a moldable, non-corrosive insulator material, such as polyvinyl chloride, is molded around the end portion of the wire insulator jacket 25a and the terminal 26 completely encasing the stripped end portion of the wire conductor 25b and ferrule portion 34 of the terminal 26.

The forward portion 41 of the molded cap 28 surrounding the ring portion 40 of the terminal 26 has a transverse through aperture 42 in alignment with an aperture 44 through the ring portion 40 of the terminal 26. The outer marginal portion of the terminal ring portion 40 is embedded in the molded cap 28 while the inner marginal portion 46 adjacent the ring aperture 44 is disposed in the cap aperture 42 and has a plurality of teeth 48 struck therefrom which project toward the right as viewed in FIG. 2 and bitingly engage the outer surface of the plug 18 which is conventionally made of soft lead material. The forward portion 41 of the molded cap 28 has an axial lip 54 having a cross section in the form of a truncated cone surrounding the exit of the cap aperture 42 which is disposed in sealing engagement with the sealing groove 27 in the case wall 14 surrounding the outer face of the side terminal 22.

Referring now to FIG. 3, the cap aperture 42 includes an intermediate cylindrical portion 49 and a reduced diameter portion forming a transverse shoulder 50 and a frustoconical seat 52 adapted for sealing engagement with the head of the connector bolt 30. The reduced diameter portion of the cap aperture 42 is undercut at 58 to aid in preventing flash from forming on the terminal portion 46 when the cap 28 is molded. The cap 28 also includes a radial inwardly projecting flexible circular lip 60 at the entrance of the aperture 42.

The connector bolt 30 comprises a shank 62 having a threaded portion 64 and a head 66 having an enlarged intermediate portion 68 rotatably disposed in the cylindrical portion 49 of the cap aperture 42. The head 66 also has a reduced diameter portion 69 disposed in the cap aperture 42 which is spaced from the frustoconical seat 52 so as to be engageable with the inner marginal portion 46 of the terminal 26. The top portion of the head 66 projecting from the cap has a hexagonal section 70 separated from a neck 71 by an annular ridge 72 as shown in FIG. 2.

The cap 28 may also include a circular boss 74 provided with a ridge 76 for retaining the optional cover 32 which can conveniently be carried on the cable by an integral strap 78 having an end looped about the insulated wire 25. The outer side wall 80 of the cover is force fit on the ridge 76 for retaining the cover in the closed position. The cover may also include an inner annular wall with a reversely folded end 82 which snaps under the ridge 72 of the bolt head 66 for additional retention.

Referring now to FIGS. 2 and 4, the cap 28 is molded around the end portion of the insulated wire 25 and the terminal 26 secured thereto in a suitable die having suitable cores for forming the cap aperture 42. After the cap 28 is molded in the die, the annular lip 60 and the projection defining the seat 52 in the aperture 42 are sufficiently resilient to allow withdrawal of the core which forms the interior contour of the aperture 42 between the terminal 26 and the entrance defined by the lip 60. After the die and cores have been removed from the cap, the connector bolt 30 may be detachably retained in the cap aperture 42 simply by inserting the threaded portion 64 of the bolt shank through the aperture 44 of the terminal 26 until the enlarged intermediate portion 68 of the bolt 30 engages the flexible annular lip 60 which is of smaller diameter. Thereupon, the enlarged portion 68 of the bolt is pushed past the flexible annular lip 60 into the detachably retained position shown in FIG. 3 where the enlarged bolt portion 68 is disposed between the flexible annular lip 60 and the terminal 26. Conversely the bolt 30 may be detached from the cable 26 without harm to either the terminal or the cap simply by applying a thrust force to the threaded portion 64 of the bolt shank and pushing the enlarged portion 68 of the bolt head 66 past the lip 60.

It should be noted that in the retained position, the bolt 30 is freely rotatable as the cylindrical portion 49 of the cap aperture 42 which has a slightly larger diameter than the enlarged portion 68 of the bolt. Further the enlarged portion 68 preferably rests on the transverse shoulder 50 or the seat 52 of the cap aperture 42 and the bolt portion 69 is preferably slightly spaced from the terminal ring portion 40 so that a seal will be effected upon assembly of the cable 16 to the side terminal 22 of the battery. The cable 26 with the detachably retained connector bolt 30 is connected to the side terminal 22 simply by screwing the bolt 30 into the socket 20. As the bolt 30 is screwed into the socket 20 the enlarged portion 68 squeezes down and sealingly engages the shoulder 50 or the seat 52 until the bolt portion 69 engages the terminal ring portion 40 whereupon the teeth 48 are forced to bite into the plug 18 and the axial lip 54 is sealingly seated in the annular sealing groove 25 thereby making a sealed mechanical and electrical connection between the cable terminal 26 and the battery terminal 22. For added protection against corrosion of the terminals, the cover 32 may be used.

We wish it to be understood that we do not desire to be limited to the exact details of construction shown and described, for obvious modifications will occur to a person skilled in the art.

What is claimed is:

1. In a battery cable comprising an elastomeric cap having a transverse aperture therethrough, a cable terminal at least partially embedded in the elastomeric cap, said cable terminal having an aperture aligned with said cap aperture and portions adjacent said cable terminal aperture disposed in said cap aperture and a connector for mechanically and electrically connecting the cable terminal to a battery terminal, said connector having a portion disposed in said cap aperture between said cable terminal portions adjacent said cable terminal aperture and an entrance of said cap aperture, the improvement comprising, said cap having integral lip means extending inwardly toward the axis of said cap aperture and spaced axially from said cable terminal portions disposed in said cap aperture toward said cap aperture entrance, said lip means and said cable terminal portion cooperatively axially retaining said connector portion in said cap aperture, said lip means having an interference fit with said connector portion and being sufficiently flexible to permit said connector portion to be pushed past said lip means for detachable retainment between said lip means and said cable terminal portions.

2. In a battery cable comprising an elastomeric cap having a transverse aperture therethrough, a cable terminal at least partially embedded in the elastomeric cap, said cable terminal having an aperture aligned with said cap aperture and portions adjacent said cable terminal aperture disposed in said cap aperture and a connector for mechanically and electrically connecting the cable terminal to a battery terminal, said connector having an enlarged portion disposed in said cap aperture between said cable terminal portions adjacent said cable terminal aperture and an entrance of said cap aperture, the improvement comprising, said cap having an annular integral lip at the entrance of said aperture to reduce the size thereof with respect to an intermediate portion of said cap aperture, said annular lip and said cable terminal portion adjacent said terminal aperture cooperatively axially rotatably retaining said enlarged portion of said connector in the intermediate portion of said cap aperture, said annular lip having an interference fit with said enlarged portion of said connector and being sufficiently flexible to permit said enlarged portion of said connector to be pushed past said annular lip for detachable retainment between said annular lip and said cable terminal portion.

* * * * *